April 23, 1935.     K. KARNATH     1,999,155

SLIDE VALVE

Filed April 12, 1932

INVENTOR:

BY Kurt Karnath

Patented Apr. 23, 1935

1,999,155

UNITED STATES PATENT OFFICE 1,999,155

SLIDE VALVE

Kurt Karnath, Zweibrucken, Germany

Application April 12, 1932, Serial No. 604,679
In Germany April 21, 1931

3 Claims. (Cl. 251—68)

This invention relates to slide valves fitted with tilting discs according to the Karnath system, which at first form a gap during opening.

The valves according to the invention are intended for use in high pressure conduits and the like. Slide valves operating on the Karnath principle were hitherto constructed so that the discs were tilted on their seats by a controlling device employing stems and cam discs. However, this construction suffers from the drawback that considerable forces have to be overcome in tilting the valve discs which, in addition, require a special design that is quite difficult to produce. The invention eliminates these defects by providing the valve discs with wedge-like projections which cooperate with wedges of a control device. The wedges of the control device are connected with the driving shaft and are displaced when the latter is raised and lowered so as to move, for example, under the wedge-shaped projections to open the valve discs which are thus tilted and removed from their seats.

The projections are found only on one side of the valve discs and constructed so that their wedge surfaces are approximately on a level with the seats of the valve discs. The form of the discs is nearly plane without disclosing projections that are difficult to produce by casting, and the manufacture as well as the mode of operation of the valves is therefore quite simple. Furthermore, since the discs are tilted on one side only from the edge, the forces required are small.

The construction of a slide valve according to the invention further comprises a cross bar on the driving spindle below the valve discs. When the upper wedges have removed the discs from their seats by tilting, this bar will engage the opposite ends of the discs and lift the latter from their seats on that side also.

To insure proper guiding of the driving spindle the valve box has a guiding device which centers the spindle during its motion and prevents it from being bent or bound.

Figure 1:
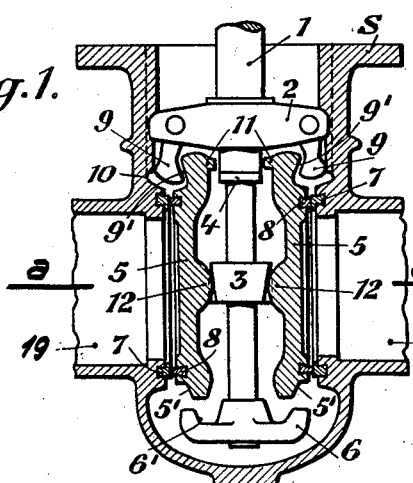
Figure 2:
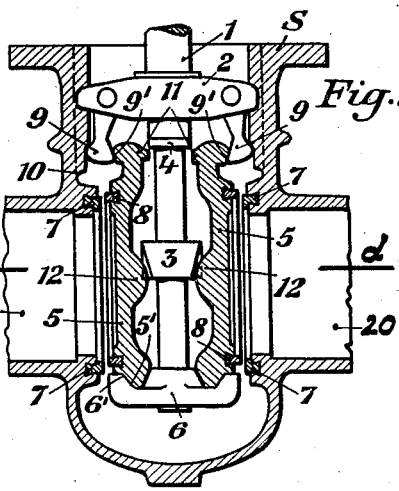
Figure 1A:
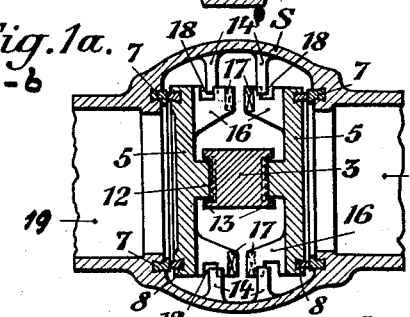
Figure 2A:
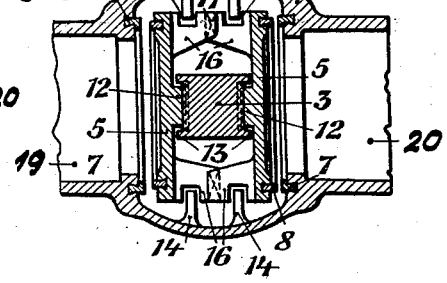
Figure 3:
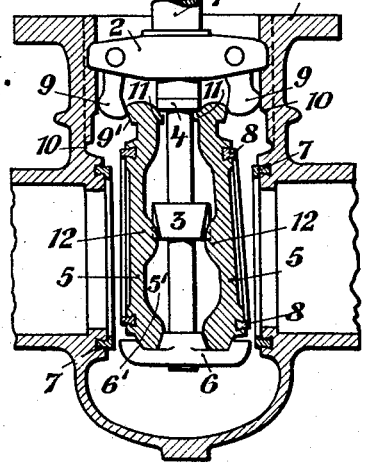
Figure 4:
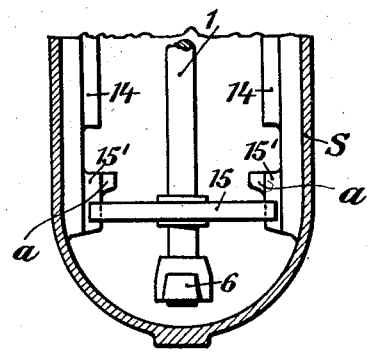

Further details of the invention are described in the specification below and shown in the accompanying drawing, in which Figure 1 is a section of a slide valve according to the invention; Fig. 1a, a section on the line a—b, of Fig. 1; Fig. 2, a section similar to the one represented by Fig. 1 when the valve is partially opened; Fig. 2a, a section on the line c—d, of Fig. 2; Fig. 3, a section similar to that of Fig. 1 when the valve is fully opened; and Fig. 4, a detail view of the guide for the driving spindle.

Referring to the drawing, the casing S contains an axially adjustable spindle 1 which can be controlled by a hand wheel, not shown. The spindle 1 carries a cross member 2 which operates in the upper free space of the valve casing S. The lower end of the spindle 1 is provided with a cross member 6 which has wedge-like notches 6' on the side facing upwardly. Between the two cross members 2 and 6 the spindle 1 carries a conical control device 3. In front of the supply and discharge pipings 19 and 20 are found the valve discs 5 which engage the seat 7 with their packing rings 8. At their upper ends the discs 5 possess the projections 9' fitted with wedge surfaces and cooperating with the control parts 9. These control parts or wedges 9 are rotatably disposed in the cross member 2 and abut with their backs on the control faces 10 arranged on the wall of the casing S. Below the cross member 2 the spindle 1 has a collar or stop 4 which can be engaged by the supports 11 of the projections 9'.

Approximately in the center of the supply and discharge conduits 19 and 20 the valve discs 5 are provided with the elevations 12 which cooperate with the conical control device 3. In order to insure this cooperation without fail, the marginal strips 13 are disposed on the control device 3 on both sides of the elevations 12.

At the lower end of the valve discs 5 on their outside the wedge-like projections 5' are provided which cooperate with the wedge-like depressions 6' in the cross member 6.

The lower ends of the valve discs 5 are further fitted with the projections 16 which, at their front ends, carry the locking parts 17. The edges of the projections 16 are recessed at 18, and these recesses cooperate with corresponding guides 14 in the casing S. To prevent shaking and rattling of the guides or the parts guided the driving spindle 1 carries a cross bar 15 guided laterally at 15' in the casing S, so that unequal stressing of the stuffing box packing or a displacement of the spindle are excluded. a indicates the stops for the downwardly moving valve plates.

The device functions as follows:

If the parts in the position shown in Figs. 1 and 1a, the conduits 19 and 20 are closed by the valve discs 5. In this case, the valve spindle 1 is turned down, and the control device 3 constructed as cam presses on the elevations 12 of the discs 5 which are thus pressed on to their seat. The projections 16, in this position, are located below the guides 14 whereby upward motion of the discs 5 is prevented, as indicated in Fig. 1a. When the slide valve is actuated for opening, the spindle 1 is drawn up by a hand wheel, not shown, and the cross member 2 with the wedges 9, the control device 3 and the lower cross member 6 cooperate in this upward motion.

The cone 3 will then be disengaged relative to the elevations 12 of the discs 5 and the wedges 9 will be pressed by the control surfaces 10 of the wall of the casing S against the wedge-like projections 9' at the upper end of the discs 5. During further upward movement of the spindle 1 the wedges 9, owing to the control surfaces 10, will be pressed inwardly still more, so that the discs 5 are moved towards each other at their upper edge, i. e., they are slightly raised from their seat at this point, whereby a gap is formed between the seat 8 and the packing ring 7 to permit compensation of pressure on both sides of the valve discs 5.

While the valve discs 5 are moved towards each other the projections 16 have also approached each other to such an extent that their parts 17 interlock, as indicated in Fig. 2a, and the recesses 18 are in register with the guides 14, whereby upward motion of the discs 5 becomes possible and the members 16 with their recesses 18 slide on the vertical guides 14. During further raising of the spindle 1 the lower cross member 6 will engage with its wedge-like recesses 6' the wedge-like projections 5' of the valve discs 5, the distance between the notches 6' being large enough to insure gradual lifting of the discs 5 from their seat at their lower edge also, owing to the engagement of the wedges 5 and the depressions 6, as indicated in Fig. 2.

The valve discs 5 are then fully carried by the spindle 1 or the cross member 6 and thus cooperate in further upward motion of the spindle. During this further upward motion the wedges 9 will be pressed still more against the projections 9' until the supports 11 on the members 9' move under the collar 4 of the spindle, as shown in Fig. 3. At this moment the valve discs 5 are rigidly connected with the spindle 1 and incapable of individual motion, so that shaking and the like is out of the question.

Furthermore, in this way the valve discs can always be safely brought in front of the conduit opening regardless of flow conditions and other processes going on in the valve box. If the parts are in the position shown in Fig. 3, the spindle can be moved up as far as the casing permits. The position of the valve discs 5 relative to the spindle 1 will not be varied, but further upward motion of the discs 5 will gradually release more and more of the conduits 19 and 20.

I claim:—

1. A valve having tilting discs and comprising a casing, a supply and a discharge conduit opening into said casing, tiltable valve discs for shutting off said supply and discharge conduits, a driving spindle for operating said valve discs, projections on one part of the circumference of said valve discs forming wedge surfaces on the side facing the casing, control surfaces in said casing, control members capable of engagement between said projections and control surfaces in said casing and cooperating with the wedge surfaces of said projections, a common carrier for said control members on said driving spindle, a control device constructed as a cone and carried by said driving spindle, elevations in the center of said valve discs cooperating with said cone, a cross member below said valve discs on said driving spindle, wedge-like depressions in said cone member, wedge-like projections at the lower portions of said valve discs opposite said wedge-like depressions in said cross member, said carrier with said control members, control device and lower cross member being lifted together during the upward motion of said driving spindle whereby the control cone releases the corresponding elevations of the valve discs and the control members slide along the control surfaces in said casing and press on the projections of said discs to remove them from their seats by tilting, the cross member located under the valve discs being brought into engagement with said wedge-like projections on said discs during further upward motion of said spindle to lift said discs from their seats on the other side also and to simultaneously fix them in position relative to said spindle.

2. A valve, comprising a casing, a supply conduit and a discharge conduit opening into said casing, valve seats formed at the points where said conduits open into said casing, valve discs engaging said seats for shutting off said conduits, a driving spindle for operating said valve discs, means on said spindle for pressing said discs to their seats, means on said spindle for tilting said discs from their seats, said means comprising a cross member disposed above said discs on the spindle, projections on the upper edge of the discs, control surfaces in the upper part of the casing and control members articulated to the ends of said cross member and engaging between said projections and control surfaces, said surfaces being inclined so that during upward motion of the spindle the control members will press away the projections and thus tilt the discs on one side from their seats, and means carried by said spindle and engaging the free edges of said discs after tilting, lifting them and securing the discs in position during lifting.

3. A valve, comprising a casing, a supply conduit and a discharge conduit opening into said casing, valve seats formed at the points where said conduits open into said casing, valve discs engaging said seats for shutting off said conduits, a driving spindle for operating said valve discs, means on said spindle for pressing said discs to their seats, tilting means for said discs comprising a cross member disposed above the discs on the spindle, projections on the upper edge of the discs, control surfaces in the upper part of the casing and members articulated to the ends of said cross member and engaging between said projections and control surfaces, said surfaces being inclined so that during upward motion of the spindle the control members will press away the projections and thus tilt the discs on one side from their seats, a collar on the spindle, and supports on the insides of the projections which engage said collar after the raising of the discs and secure them in position.

KURT KARNATH.